No. 865,025. PATENTED SEPT. 3, 1907.
N. C. DURAND.
DICTATION MEMORANDUM SHEET.
APPLICATION FILED AUG. 30, 1905.
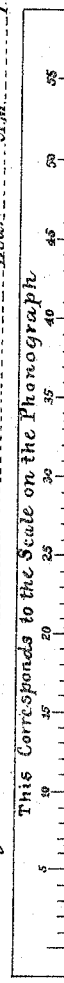

UNITED STATES PATENT OFFICE.

NELSON C. DURAND, OF EAST ORANGE, NEW JERSEY, ASSIGNOR TO NEW JERSEY PATENT COMPANY, OF WEST ORANGE, NEW JERSEY, A CORPORATION OF NEW JERSEY.

DICTATION MEMORANDUM-SHEET.

No. 865,025.

Specification of Letters Patent.

Patented Sept. 3, 1907.

Application filed August 30, 1905. Serial No. 276,472.

*To all whom it may concern:*

Be it known that I, NELSON C. DURAND, a citizen of the United States, residing at East Orange, Essex county, State of New Jersey, have invented a certain new and useful Dictation Memorandum-Sheet, of which the following is a description.

My invention relates to memorandum sheets adapted for use in connection with commercial talking machines of the type wherein the position of the recorder or reproducer with respect to the blank or record is indicated by means of a scale and pointer, (see patent to Weber and Hibbard, No. 772,485, dated October 18, 1904) and my object is to provide a memorandum sheet by which convenient and comprehensible instructions may be given to the transcriber as to the condition of the dictated work.

Broadly speaking, the invention consists of a sheet carrying the representation of a scale corresponding to that of the talking machine, and preferably with a blank space of sufficient area to permit pencil or other memoranda to be jotted down, directing the attention of the transcriber to the condition of the dictated work in its relation to said scale, all as will more fully hereinafter be pointed out and claimed.

In the accompanying drawing, forming a part hereof, I will illustrate my improved memorandum sheet, with indicia thereon, by which the transcriber will be informed as to the particular point on the record where dictated matter was commenced and to which the sheet is supposed to apply, and also, that mistakes in dictation were made therein in three places, and finally, where such mistakes occur on the record, so as to be avoided in the transcribing.

The sheet 1 is of any suitable size, proportions, and character, either of card-board or paper, and carries the representation 2 of the scale on the talking machine, though not necessarily of the same dimensions. The sheet may also contain printed matter as shown, indicating its nature, its use, information as to the identity of the persons dictating and transcribing, and the times of such dictation and transcription, though this printed matter is not important and may be widely varied. Preferably, sufficient space is allowed below or otherwise adjacent to the scale, to permit memoranda to be jotted down for the further guidance of the transcriber, as for instance, that certain dictated matter occurring at any point of the scale is not to be transcribed; that certain words or phrases are to be substituted for dictated matter, etc. In its simplest form, however, the invention consists of a memorandum sheet carrying the representation of the scale of a talking machine, essentially as shown. In use the person dictating a letter, for example, indicates on the sheet by "X" in pencil, where the particular matter to which the sheet applies is commenced, as shown. There may be other dictated letters on the same cylinder, but by the use of the sheet the particular letter to be transcribed will be exactly located. In dictating, a mistake is supposed to be made when the pointer of the talking machine indicates 15. The dictator marks an "M" on the sheet, and makes the desired correction on the talking machine. Other mistakes are supposed to be made at 27 and 35, and are indicated on the sheet in the same way. When the record in question is to be transcribed on the typewriter, for example, the operator has before him the corresponding memorandum sheet. He is immediately informed that the letter begins at 6, and starts his reproducer at that point without having to experiment to find out. He also knows that mistakes are to be expected at the points 15, 27 and 35 and is accordingly on the lookout for them, and makes the desired corrections. By providing the sheet with a scale as explained, the operator has a much better and more vivid impression as to the location of errors, etc. in the dictated work than would be conveyed by written instructions, while at the same time the convenience to the person dictating is enormously increased. Actual experience has demonstrated that by the use of my improved memorandum sheets, the operation of commercial talking machines, both in dictation and transcription will be materially facilitated.

Having now described my invention, what I claim as new therein and desire to secure by Letters Patent is:

1. A dictation memorandum for talking machines, comprising a sheet carrying the representation of the scale of the talking machine, and properly designated spaces for entering data identifying the talking machine record and persons using the same, and having a blank space at that side of the representation of the scale whereon the subdivisions of the scale appear, substantially as set forth.

2. A dictation memorandum for talking machines comprising a sheet carrying a representation of the scale of the talking machine, and a printed reference to said talking machine scale within the said representation thereof, and having at one side of the said representation properly designated spaces for entering data identifying the talking machine cylinder, the person dictating and the person transcribing and having a blank space at the opposite side of the representation of the scale, whereon the subdivisions of the scale appear, substantially as set forth.

This specification signed and witnessed this 1st day of August 1905.

NELSON C. DURAND.

Witnesses:
WM. PELZER,
FRANK H. FERRY.